(12) United States Patent
Shang et al.

(10) Patent No.: US 11,669,245 B2
(45) Date of Patent: Jun. 6, 2023

(54) METHOD FOR MANAGING STORAGE DEVICES, ELECTRONIC DEVICE AND COMPUTER-READABLE MEDIUM

(71) Applicant: EMC IP Holding Company LLC, Hopkinton, MA (US)

(72) Inventors: Rongrong Shang, Beijing (CN); Geng Han, Beijing (CN); Xiaobo Zhang, Beijing (CN); Ruiyong Jia, Beijing (CN); Xiongcheng Li, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/831,340

(22) Filed: Mar. 26, 2020

(65) Prior Publication Data

US 2020/0341649 A1    Oct. 29, 2020

(30) Foreign Application Priority Data

Apr. 24, 2019    (CN) .......................... 201910336148.5

(51) Int. Cl.
  *G06F 3/00*    (2006.01)
  *G06F 3/06*    (2006.01)
(52) U.S. Cl.
  CPC .......... *G06F 3/0608* (2013.01); *G06F 3/0631* (2013.01); *G06F 3/0659* (2013.01); *G06F 3/0689* (2013.01)

(58) Field of Classification Search
  CPC .... G06F 3/0608; G06F 3/0631; G06F 3/0659; G06F 3/0689
  See application file for complete search history.

(56) References Cited

U.S. PATENT DOCUMENTS

| | | | |
|---|---|---|---|
| 5,987,621 A * | 11/1999 | Duso .................... | G06F 11/2023 348/E5.008 |
| 10,296,252 B1 | 5/2019 | Han et al. | |
| 10,552,078 B2 | 2/2020 | Gong et al. | |
| 10,592,111 B1 | 3/2020 | Wang et al. | |
| 10,678,643 B1 | 6/2020 | Gao et al. | |
| 2002/0035666 A1 * | 3/2002 | Beardsley ........... | G06F 12/0804 711/E12.04 |
| 2015/0012702 A1 * | 1/2015 | Wang .................... | G06F 3/0632 711/114 |
| 2017/0220282 A1 * | 8/2017 | Dambal ................ | G06F 3/0604 |
| 2018/0246668 A1 * | 8/2018 | Sakashita ................ | G06F 3/061 |

* cited by examiner

*Primary Examiner* — Craig S Goldschmidt
(74) *Attorney, Agent, or Firm* — BainwoodHuang

(57) ABSTRACT

Techniques provide for managing storage devices. Such techniques involve: combining storage devices in a redundant array of independent disks into a group of storage devices in an order of physical capacities of the storage devices; determining a first number of sets of storage devices based on a number of storage devices in the group and a threshold number of storage devices to be divided into each of the sets; and dividing, based on a configuration of the redundant array of independent disks, the group of storage devices into the first number of sets of storage devices, to optimize an effective capacity of the redundant array of independent disks.

8 Claims, 10 Drawing Sheets

METHOD FOR MANAGING STORAGE DEVICES, ELECTRONIC DEVICE AND COMPUTER-READABLE MEDIUM

CROSS REFERENCE TO RELATED APPLICATION

This application claims priority to Chinese Patent Application No. CN201910336148.5, on file at the China National Intellectual Property Administration (CNIPA), having a filing date of Apr. 24, 2019, and having "METHOD FOR MANAGING STORAGE DEVICES, ELECTRONIC DEVICE AND COMPUTER-READABLE MEDIUM" as a title, the contents and teachings of which are herein incorporated by reference in their entirety.

FIELD

Embodiments of the present disclosure generally relate to a field of data storage, and more specifically, to a method, electronic device and computer readable medium for managing storage devices.

BACKGROUND

Conventionally a storage system is constructed with the technology of a redundant array of independent disks (RAID). In order to achieve high reliability of the storage system, it is required to restrict the number of storage devices involved in rebuilding of the storage system. When the number of storage devices in the storage system exceeds a threshold number, it needs to group the storage devices into a plurality of sets of storage devices. How to perform the dividing becomes a hot issue.

SUMMARY

Embodiments of the present disclosure provide a method, device and computer readable medium for managing storage devices.

In a first aspect of the present disclosure, there is provided a method of managing storage devices. The method includes: combining storage devices in a redundant array of independent disks into a group of storage devices in an order of physical capacities of the storage devices; determining a first number of sets of storage devices based on a number of storage devices in the group and a threshold number of storage devices to be divided into each of the sets; and dividing, based on a configuration of the redundant array of independent disks, the group of storage devices into the first number of sets of storage devices, to optimize an effective capacity of the redundant array of independent disks.

In some embodiments, dividing the group of storage devices into the sets includes: dividing the group of storage devices into the sets by: causing a number of storage devices with a maximum physical capacity in each of the sets to be above a sum of a width of the redundant array of independent disks and a number of reserved storage devices in each of the sets; or causing a number of storage devices with the maximum physical capacity in a first set of the sets to be below the sum, and causing respective numbers of storage devices with the maximum physical capacity in other sets of the sets than the first set to be above the sum, wherein the first set of storage devices includes storage devices with the maximum physical capacity among the group of storage devices.

In some embodiments, dividing the group of storage devices into the sets includes: generating a first allocation matrix based on the group of storage devices, a number of rows in the first allocation matrix being equal to a second number of types of the physical capacities of the storage devices, a number of columns in the first allocation matrix being equal to the first number of sets, elements in the first allocation matrix representing numbers of storage devices with the respective types of physical capacities in the respective sets of the sets, an order of the rows in the first matrix corresponding to the order of the physical capacities.

In some embodiments, generating the first allocation matrix includes: generating a second allocation matrix based on the group of storage devices, a number of rows in the second allocation matrix being equal to the second number, a number of columns in the second allocation matrix being equal to one, differences between elements in successive rows in the second allocation matrix being equal to the numbers of storage devices with the respective types of physical capacities; generating a third allocation matrix by splitting each of the elements in the second allocation matrix into the first number of elements; and generating the first allocation matrix based on the third allocation matrix, each of the elements in the first allocation matrix being equal to a difference between the elements in the respective successive rows in the third allocation matrix.

In some embodiments, each element of the first number of elements is above the sum of the width of the redundant array of independent disks and the number of reserved storage devices.

In some embodiments, combining the storage devices in the redundant array of independent disks into the group of storage devices in the order of physical capacities of the storage devices includes: combining the storage devices in the redundant array of independent disks into the group of storage devices in a descending order of the physical capacities.

In a second aspect of the present disclosure, there is provided an electronic device. The electronic device includes: at least one processor; and a memory coupled to the processor, the memory storing computer programs, the computer programs, when executed by the processor, causing the electronic device to perform acts including: combining storage devices in a redundant array of independent disks into a group of storage devices in an order of physical capacities of the storage devices; determining a first number of sets of storage devices based on a number of storage devices in the group and a threshold number of storage devices to be divided into each of the sets; and dividing, based on a configuration of the redundant array of independent disks, the group of storage devices into the first number of sets of storage devices, to optimize an effective capacity of the redundant array of independent disks.

In a third aspect, there is provided a computer readable medium. The computer readable medium includes machine executable instructions. The machine executable instructions, when executed by a device, cause the device to perform the method according to the first aspect.

This Summary is not intended to identify key features or essential features in the embodiments of the present disclosure, nor is it intended to be used to limit the scope of the present disclosure. Other features of the present disclosure will become apparent through the description below.

BRIEF DESCRIPTION OF THE DRAWINGS

The above and other objectives, features and advantages of the present disclosure will become more apparent, through the following detailed description on the example embodiments of the present disclosure with reference to the accompanying drawings, in which the same reference symbols generally refer to the same elements.

DETAILED DESCRIPTION OF EMBODIMENTS

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Embodiments of the present disclosure will now be described in detail with reference to the accompanying drawings. Although the drawings illustrate some embodiments of the present disclosure, it would be appreciated that the present disclosure may be implemented in various manners but cannot be construed as being limited by the embodiments illustrated herein. Rather, these embodiments are provided to disclose the present disclosure more thoroughly and completely, and to convey the scope of the present disclosure fully to those skilled in the art.

In the following description about the implementations of the present disclosure, the term "includes" and its variants are to be read as open-ended terms that mean "includes, but is not limited to." The term "based on" is to be read as "based at least in part on." The term "one embodiment/implementation" and "the embodiment/implementation" are to be read as "at least one embodiment/implementation." The terms "first," "second," and the like may refer to different or the same objects. Other definitions, either explicit or implicit, may be included below.

Figure 1:
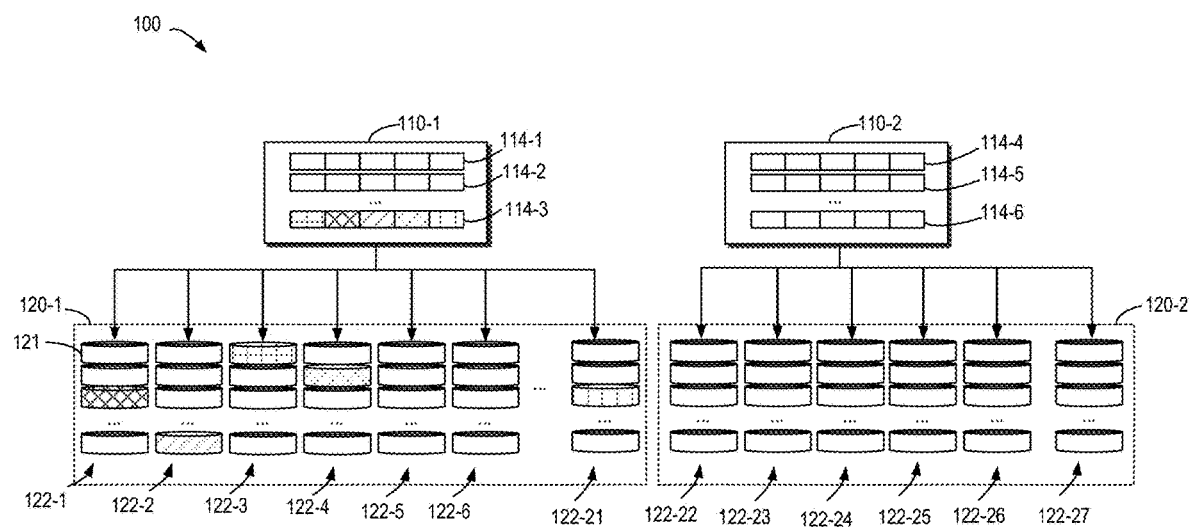
FIG. 1 is a schematic diagram illustrating a storage system in which embodiments of the present disclosure may be implemented.

FIG. 1 is a schematic diagram illustrating a storage system 100 in which embodiments of the present disclosure may be implemented. The system 100 includes a plurality of physical storage devices 122-1, 122-2 . . . 122-27 for providing physical storage spaces. These storage devices may be collectively or individually referred to as storage devices 122 or a storage device 122. The storage devices 122 may be various persistent storage devices. For example, the storage devices 122 may include, but are not limited to, Digital Versatile Discs (DVDs), Blu-ray Discs (BDs), Compact Discs (CDs), floppy disks, hard disks, tape drives, optical drives, Solid-State Memory Devices (SSD), and the like. Each of the storage devices 122 may be partitioned into a plurality of slices 121. Each of the slices 121 has a fixed storage capacity. RAID may combine the slices 121 on different storage devices into RAID stripes 114 which may include stripes 114-1, 114-2 . . . 114-6. For example, the RAID may form a stripe 114-3 for RAID 5 on the respective slices 121 on the storage devices 122-1, 122-2, 122-3, 122-4 and 122-21.

In order to ensure reliability of the RAID, it is typically required to allocate, within a limited number of storage devices, slices to the RAID stripes. The limited number of storage devices form a set of storage devices. If the number of storage devices in a system is greater than the limited number, there may be a further set of storage devices. In other words, the storage system 100 may group, based on the number of the storage devices, the plurality of storage devices into one or more sets of storage devices, and slices in the same RAID stripe 114 come from the storage devices in the same set of storage devices. In this way, the number of the storage devices in such set of storage devices can meet a minimum number of storage devices required for establishing an RAID strip. In addition, the number of storage devices in a set of storage devices cannot be too great. Otherwise, it may bring about a higher failure probability of the storage devices and thus reduce the reliability. As shown in FIG. 1, the plurality of physical storage devices 122-1, 122-2 . . . 122-27 in the system 100 are divided into a first set of storage devices 120-1 and a second set of storage devices 120-2. The first set of storage devices 120-1 includes the storage devices 122-1, 122-2 . . . 122-21, and the second set of storage devices 120-2 includes the storage devices 122-22, 122-23 . . . 122-27. In the RAID, slices in the first RR 120-1 form a first set of stripes 110-1, and slices in the second set of storage devices 120-2 form a second set of stripes 110-2. The first set of stripes 110-1 includes stripes 114-1, 114-2 . . . 114-3, and the second set of storage devices 110-2 includes stripes 114-4, 114-5 . . . 114-6.

Typically, only when the number of storage devices in the existing set of storage devices in the RAID is not greater than the limited number, it is allowed to add new storage devices to the existing set of storage devices. If the number of storage devices in the set of storage devices is greater a threshold number and the number of new storage devices does not satisfy the RAID width requirement, the new storage devices cannot be added to the set of storage devices. If the number of the new storage devices satisfies the RAID width requirement, the new storage devices may be successfully added into the RAID, and a new set of storage devices thus is formed. Since the current storage system does not support re-allocation of storage devices in the existing set of storage devices and the new set of storage devices, it may not be the optimum solution to form a new set of storage devices, considering the total effective capacity of the RAID.

According to embodiments of the present disclosure, there is provided a solution of allocating storage devices to support expansion for a set of storage devices. The solution includes combining storage devices in an RAID into a group of storage devices in an order of physical capacities of the storage devices, and dividing, based on a configuration of the RAID, the storage devices into a plurality of sets, so as to optimize the effective capacity of the RAID. The solution according to embodiments of the present disclosure can support addition of any number of new storage devices into the existing sets of storage devices by providing re-allocation of the storage devices to the sets of storage device. Moreover, since the storage devices are divided into the plurality of sets based on the configuration of RAID, the solution can optimize the effective capacity of the RAID and improve the utilization efficiency of storage devices.

Figure 2:
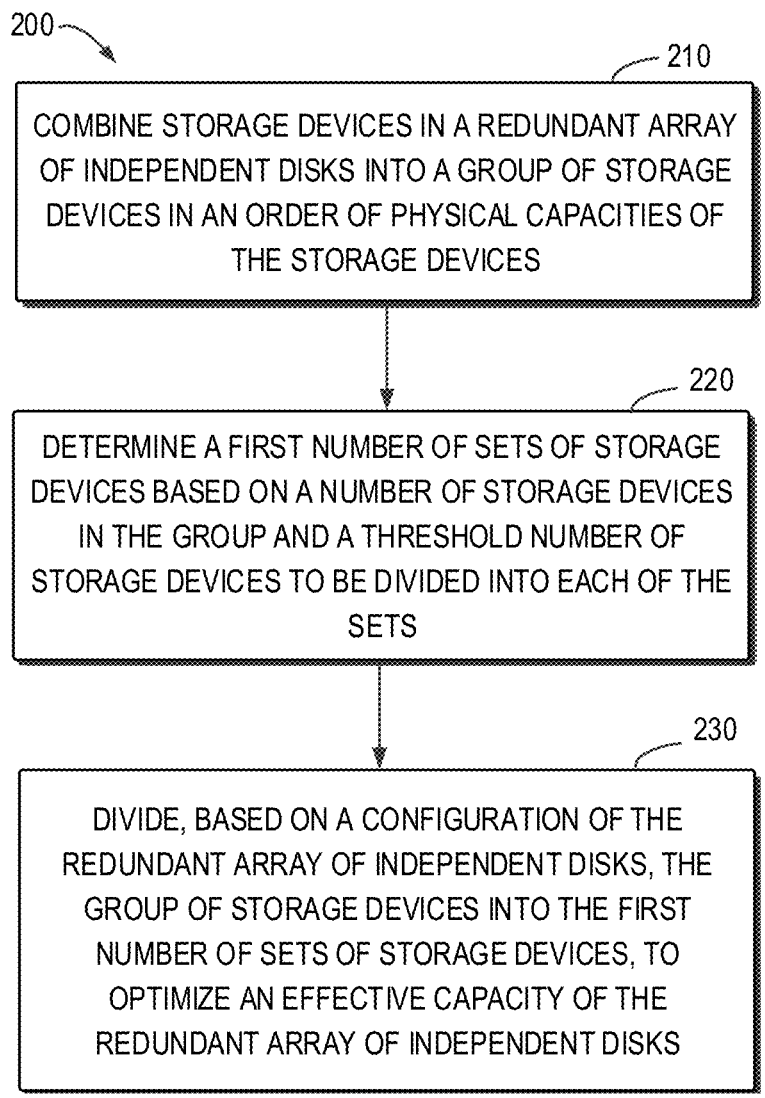
FIG. 2 is a block diagram of a method of managing storage devices according to some embodiments of the present disclosure.

Embodiments of the present disclosure will be detailed below with reference to the accompanying drawings. FIG. 2 is a block diagram illustrating a method 200 of managing storage devices according to embodiments of the present disclosure. The method 200 may be implemented in the storage system 100 in FIG. 1 and executed by a processor. For ease of discussion, the method 200 will be described with reference to FIG. 1.

At block 210, storage devices in an RAID are combined into a group of storage devices in an order of physical capacities of the storage devices. In some embodiments, the storage devices may include a plurality of storage devices for initializing the RAID. In other embodiments, the storage devices may include storage devices in the existing set of storage devices of the RAID and include new storage devices to be added to the RAID.

In some embodiments, the storage devices in the RAID may be combined into the group of storage devices in a descending order of the physical capacities. In other embodiments, the storage devices in the RAID may be combined into the group of storage devices in an ascending order of the physical capacities.

At block 220, a first number of a plurality of sets into which the storage devices are to be divided is determined based on the number of the storage devices, a threshold number of storage devices in each of the sets, and a configuration of the RAID. In some embodiments, the sets into which the storage devices are to be divided may be RAID Resiliency Sets (RRSs). For the purpose of discussion, RRSs will be taken below as the example of the sets into which the storage devices are to be divided for describing embodiments of the present disclosure.

In some embodiments, the threshold number of storage devices in each set may be any appropriate number. For example, the threshold number may be 25.

In some embodiments, based on the number of storage devices and the threshold number of the storage devices in each set, the first number of the plurality of sets may be determined as a minimum integer greater than a quotient of dividing the number of storage devices by the threshold number. For example, if the number of storage devices is 30 and the threshold number of storage devices in each set is 25, the first number of the plurality of sets is determined as $\lceil 30/25 \rceil$ (i.e., 2). For another example, if the number of storage devices is 60 and the threshold number of storage devices in each set is 25, the first number of the plurality of sets is determined as $\lceil 60/25 \rceil$ (i.e., 3).

At block 230, based on a configuration of the redundant array of independent disks, the storage devices are divided into the first number of the sets, so as to optimize an effective capacity of the redundant array of independent disks. In some embodiments, examples of the configuration of the RAID include, but are not limited to, RAID-1, RAID-2, RAID-3, RAID-4, 4D+1P RAID-5, 8D+1P RAID-5, 16D+1P RAID-5, RAID-6, RAID-10, RAID-50, and the like.

Figure 3:
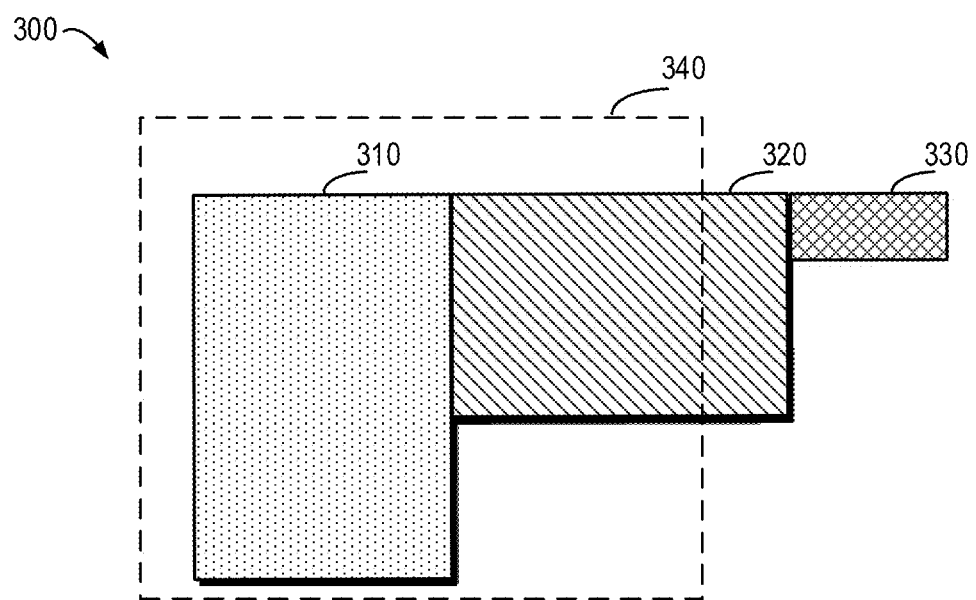
FIG. 3 is a schematic diagram illustrating an RAID according to some embodiments of the present disclosure.

Determination of the effective capacity according to embodiments of the present disclosure will be described below with reference to FIG. 3. FIG. 3 is a schematic diagram illustrating RAID 300 according to an embodiment of the present disclosure. As shown in FIG. 3, the RAID 300 includes a first set of storage devices 310, a second set of storage devices 320, and a third set of storage devices 330 which are arranged in a descending order of the physical capacities of the storage devices.

The first set of storage devices 310 includes 3 storage devices each having a physical capacity of $C_{large}$. The second set of storage devices 320 includes 4 storage devices each having a physical capacity of $C_{middle}$. The third set of storage devices 330 includes 2 storage devices each having a physical capacity of $C_{small}$, where $C_{large} > C_{middle} > C_{small}$.

In some embodiments, based on the configuration of the RAID 300 and the number of storage devices that are reserved in the RAID 300, the number of slices required for stripe allocation is determined. For example, in a case where the RAID 300 has the configuration of 4D+1P RAID-5 and the number of the reserved storage device is 1, the number of slices required for stripe allocation is 5+1 (i.e., 6).

Further, in the descending order of the physical capacities, the determined number (for example, 6) of storage devices are selected from the RAID 300 to form a subset of storage devices. For example, in the example of FIG. 3, all of the three storage devices in the first set of storage devices 310 and the three storage devices in the second set of storage devices 320 are selected from the RAID 300 to form a subset of storage devices 340. In other words, the subset of storage devices 340 includes three storage devices each having a physical capacity of $C_{large}$ and three storage devices each having a physical capacity $C_{middle}$.

Further, the physical capacity of the storage devices having the minimum physical capacity in the subset of storage devices 340 is determined as an effective capacity of each storage device in the subset of storage devices 340. For instance, in the above example, the physical capacity $C_{middle}$ of the storage devices having the physical capacity $C_{middle}$ is an effective capacity of each storage device in the subset of storage devices 340.

In addition, for other storage devices in the RAID 300 than the subset of storage devices 340, their physical capacities are determined as their respective effective capacities.

Therefore, in the above example, a total effective capacity of the RAID 300 is equal to $7*C_{middle}+2*C_{small}$.

In some embodiments, dividing the storage devices into the plurality of sets includes dividing by causing the number of storage devices having a maximum physical capacity in each of the sets to be above a sum of a width of the RAID and the number of storage devices in each of the sets that are reserved.

In some other embodiments, dividing the storage devices into the plurality of sets includes dividing by causing the number of storage devices having the maximum physical capacity in a first set of the sets to be below the sum of the width of the RAID and the number of storage devices in each of the sets that are reserved, and causing respective numbers of storage devices having the maximum physical capacity in other sets of the sets than the first set to be above the sum. The first set includes storage devices having the maximum physical capacity among the storage devices.

In some embodiments, dividing storage devices into the plurality of sets includes generating a first allocation matrix based on the group of storage devices. The number of rows in the first allocation matrix is equal to a second number of types of the physical capacities of the storage devices. The number of columns in the first allocation matrix is equal to the first number of the sets. Elements in the first allocation matrix represent numbers of storage devices having respective types of physical capacities in respective sets of the sets. For example, the first allocation matrix in the following form may be generated based on the groups of storage devices:

$$A_{M,N} = \begin{Bmatrix} a_{1,1} & a_{1,2} & & a_{1,N-1} & a_{1,N} \\ a_{2,1} & a_{2,2} & \cdots & a_{2,N-1} & a_{2,N} \\ a_{3,1} & a_{3,2} & & a_{3,N-1} & a_{3,N} \\ & & \cdots & & \\ & & \cdots & & \\ a_{M-2,1} & a_{M-2,2} & & a_{M-2,N-1} & 0 \\ a_{M-2,1} & a_{M-1,2} & \cdots & 0 & 0 \\ a_{M,1} & 0 & & 0 & 0 \end{Bmatrix}$$

where $A_{M,N}$ represents the first allocation matrix, M represents the number of types of physical capacities of storage devices and is a positive integer, N represents a first number of the plurality of sets and is an integer greater than 1, and $a_{i,j}$ represents the number of storage devices having a physical capacity of a type i included in the set j.

In some embodiments, an order of rows in the first allocation matrix corresponds to the order of the physical capacities of the storage devices. In the embodiment in which the storage devices in the RAID are divided into the group of storage devices in the descending order of the physical capacities, the order of rows in the first matrix corresponds to the ascending order of the physical capacities of the storage devices. For example, in the first allocation matrix $A_{M,N}$, from M to 1, the physical capacities of the respective storage devices may be decreased accordingly.

In the embodiment in which the storage devices in the RAID are divided into the group of storage devices in the ascending order of the physical capacities, the order of rows in the first allocation matrix corresponds to the ascending order of the physical capacities of the storage devices. For example, in the first allocation matrix $A_{M,N}$, from M to 1, the physical capacities of the respective storage devices may be increased accordingly.

The process of generating the first allocation matrix according to an embodiment of the present disclosure will be described below with reference to FIG. 4.

Figure 4:
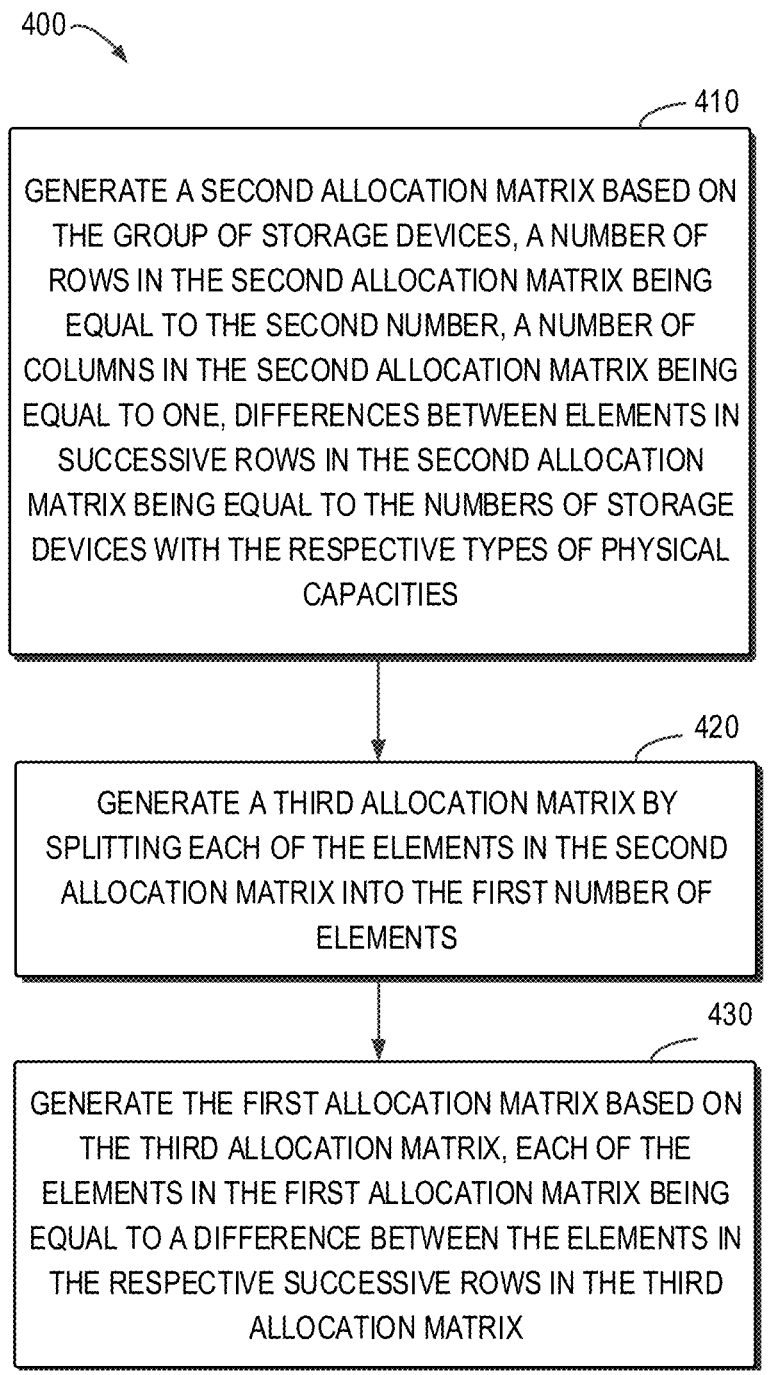
FIG. 4 is a block diagram illustrating a method of managing storage devices according to some other embodiments of the present disclosure.

As shown in FIG. 4, in block 410, generating the first allocation matrix includes generating a second allocation matrix based on the group of storage devices. The number of rows in the second allocation matrix is equal to the number of types of physical capacities, and the number of columns in the second allocation matrix is equal to one. Differences between elements in successive rows in the second allocation matrix are equal to the numbers of storage devices having respective types of physical capacities. For example, the second allocation matrix in the following form may be generated based on the group of storage devices:

$$C_{M,1} = \begin{Bmatrix} C_M + C_{M-1} + C_{M-2} + \cdots + C_1 \\ C_M + C_{M-1} + C_{M-2} + \cdots + C_2 \\ C_M + C_{M-1} + C_{M-2} + \cdots + C_3 \\ \cdots \\ C_M + C_{M-1} + C_{M-2} \\ C_M + C_{M-1} \\ C_M \end{Bmatrix},$$

where $C_{M,1}$ represents the second matrix, the order of $C_M$, $C_{M-1}, \ldots, C_3, C_2, C_1$ corresponds to the order (for example, the ascending order or the descending order) of the physical capacities of the storage devices, $C_k$ represents a total number of storage devices having a physical capacity of a type k and $k \in [1, M]$, and $C_{total} = C_M + C_{M-1} + C_{M-2} + \ldots + C_1$ represents a total number of storage devices having physical capacities of M types.

Continuing to refer to FIG. 4, at block 420, each of the elements in the second allocation matrix is split into the first number (i.e., the number of the plurality of sets) of elements to generate a third allocation matrix. For example, the third allocation matrix in the following form may be generated based on the second allocation matrix:

$$B_{M,N} = \begin{Bmatrix} b_{1,1} & b_{1,2} & & b_{1,N-1} & b_{1,N} \\ b_{2,1} & b_{2,2} & \cdots & b_{2,N-1} & b_{2,N} \\ b_{3,1} & b_{3,2} & & b_{3,N-1} & b_{3,N} \\ & & \cdots & & \\ b_{M-2,1} & b_{M-2,2} & & b_{M-2,N-1} & b_{M-2,N} \\ b_{M-1,1} & b_{M-1,2} & \cdots & b_{M-1,N-1} & b_{M-1,N} \\ b_{M,1} & b_{M,2} & & b_{M,N-1} & b_{M,N} \end{Bmatrix}$$

Criterion for splitting each element in the second allocation matrix $C_{M,1}$ to generate a third allocation matrix $B_{M,N}$ will be described by considering an example. In the example, the threshold number of the storage devices in each RRS is equal to 25 and the elements in the first row of the second allocation matrix $C_{M,1}$ will be split.

(1) If $25 < C_M + C_{M-1} + C_{M-2} + \ldots + C_1 \leq 50$, it can be determined that the first number (which is represented by N) of the plurality of sets is equal to 2, and the elements in the first row of the third allocation matrix $B_{M,N}$ can be represented as follows:

$b_{1,1} = 25$ and $b_{1,2} = C_M + C_{M-1} + C_{M-2} + \ldots + C_1 - 25$.

(2) If $50 < C_M + C_{M-1} + C_{M-2} + \ldots + C_1 \leq 75$, it can be determined that the first number (which is represented by N) of the plurality of sets is equal to 3, and the elements in the first row of the third allocation matrix $B_{M,N}$ can be represented as follows:

$b_{1,1} = 25, b_{1,2} = 25$ and $b_{1,3} = C_M + C_{M-1} + C_{M-2} + \ldots + C_1 - 50$ (3) If $75 < C_M + C_{M-1} + C_{M-2} + \ldots + C_1 \leq 100$, it can be determined that the first number (which is represented by N) of the plurality of sets is equal to 4, and the elements in the first row of the third allocation matrix $B_{M,N}$ can be represented as follows:

$b_{1,1} = 25, b_{1,2} = 25, b_{1,3} = 25$ and $b_{1,4} = C_M + C_{M-1} + C_{M-2} + \ldots + C_1 - 75$.

In addition, when each element in the second allocation matrix $C_{M,1}$ is split, it should be ensured that each element obtained from splitting is greater than or equal to a sum of the width of the RAID and the number of the reserved storage devices in each set. For example, in an embodiment of 4D+1P RAID 5 in which the number of the reserved storage device is 1, a certain element in the matrix $C_{M,1}$ is split into $b_{1,1}=25$ and $b_{1,2}=2$. However, when it is ensured that each element obtained from splitting is greater than or equal to the sum (i.e., 6) of the width of the RAID and the number of the reserved storage device in each set, $b_{1,1}$ and $b_{1,2}$ should be adjusted. For example, $b_{1,1}$ and $b_{1,2}$ may be adjusted to $b_{1,1}=21$ $b_{1,2}=6$.

In addition, when each element in the second allocation matrix $C_{M,1}$ is split, $b_{i,j} \geq b_{i+1,j}$ should be satisfied.

It would be appreciated that the example in which the threshold number of storage devices of each RRS is 25 and the elements in the first row of the matrix $C_{M,1}$ is split is provided only for describing the splitting criterion. However, the above criterion is also applicable to other threshold numbers of storage devices of RRS and splitting of elements in other rows of the matrix $C_{M,1}$.

Return to FIG. 4, at block 430, the first allocation matrix is generated based on the third allocation matrix, wherein each element in the first allocation matrix is equal to a difference between elements in successive rows in the third allocation matrix.

For example, the first matrix $A_{M,N}$ in the following form can be generated by subtracting the elements in the next row of the third allocation matrix $B_{M,N}$ from the elements in the previous row:

$$A_{M,N} = \begin{Bmatrix} b_{1,1}-b_{2,1} & b_{1,2}-b_{2,2} & b_{1,N-1}-b_{2,N-1} & b_{1,N}-b_{2,N} \\ b_{2,1}-b_{3,1} & b_{2,2}-b_{3,2} & \ldots & b_{2,N-1}-b_{3,N-1} & b_{2,N}-b_{3,N} \\ b_{3,1}-b_{4,1} & b_{3,2}-b_{4,2} & & b_{3,N-1}-b_{4,N-1} & b_{3,N}-b_{4,N} \\ & & \ldots & & \\ b_{M-2,1}-b_{M-1,1} & b_{M-2,2}-b_{M-1,2} & & b_{M-2,N-1} & b_{M-2,N}-b_{M-1,N} \\ b_{M-1,1}-b_{M,1} & b_{M-1,2}-b_{M,2} & \ldots & b_{M-1,N-1} & b_{M-1,N}-b_{M,N} \\ b_{M,1} & b_{M,2} & & b_{M,N-1} & b_{M,N} \end{Bmatrix}$$

In some embodiments, the following data structure may be employed for storing information of the group of storage devices in the RAID into which the storage devices are combined in the order of physical capacities of the storage devices.

```
typedef struct cyc_raid_all_rrs_calc_ecap_env_s
{
uint32_t raid_width;
uint32_t uber_extent_cnt;
uint32_t disk_cap_list[CYC_RAID_MAX_SIZE_ALL_RRS]; /* reverse ordered disk cap list */
uint32_t   disk_ecap_list[CYC_RAID_MAX_SIZE_ALL_RRS];
/*reverse   ordered   disk effective cap list */
uint32_t disk_cnt_list[CYC_RAID_MAX_SIZE_ALL_RRS); /* reverse ordered disk count of each disk cap list */
} cyc_raid_rrs_calc_ecap_env_t
```

In the above data structure, raid_width represents a width of a RAID, uber_extent_cnt represents the number of ubers, disk_cap_list[CYC_RAID_MAX_SIZE_ALL_RRS] represents an array storing physical capacities of all of the storage devices in the group of storage devices, disk_ecap_list [CYC_RAID_MAX_SIZE_ALL_RRS] represents an array storing effective capacities of all of the storage devices in the group of storage devices, and disk_cnt_list[CYC_RAID_ MAX_SIZE_ALL_RRS] represents an array storing numbers of storage devices having respective physical capacities in the group of storage devices.

In some embodiments, the following data structure may be employed for storing information of the storage devices in each RRS:

```
typedef struct cyc_raid_all_rrs_calc_ecap_env_s
{
uint32_t raid_width;
uint32_t uber_extent_cnt;
uint32_t disk_cap_list[CYC_RAID_MAX_SIZE_PER_RRS]; /* reverse ordered disk cap list */
uint32_t   disk_ecap_list[CYC_RAID_MAX_SIZE_PER_RRS];
/*reverse   ordered   disk effective cap list */
uint32_t disk_cnt_list[CYC_RAID_MAX_SIZE_PER_RRS); /* reverse ordered disk count of each disk cap list */
} cyc_raid_rrs_calc_ecap_env_t
```

In the above data structure, raid_width represents a width of a RAID, uber_extent_cnt represents the number of ubers, disk_cap_list[CYC_RAID_MAX_SIZE_ALL_RRS] represents an array storing physical capacities of all storage devices in a respective RRS, disk_ecap_list[CYC_RAID_ MAX_SIZE_ALL_RRS] represents an array storing effective capacities of all storage devices in the respective RRS, and disk_cnt_list[CYC_RAID_MAX_SIZE_ALL_RRS] represents an array storing numbers of storage devices having respective physical capacities in the respective RRS.

Figure 5:
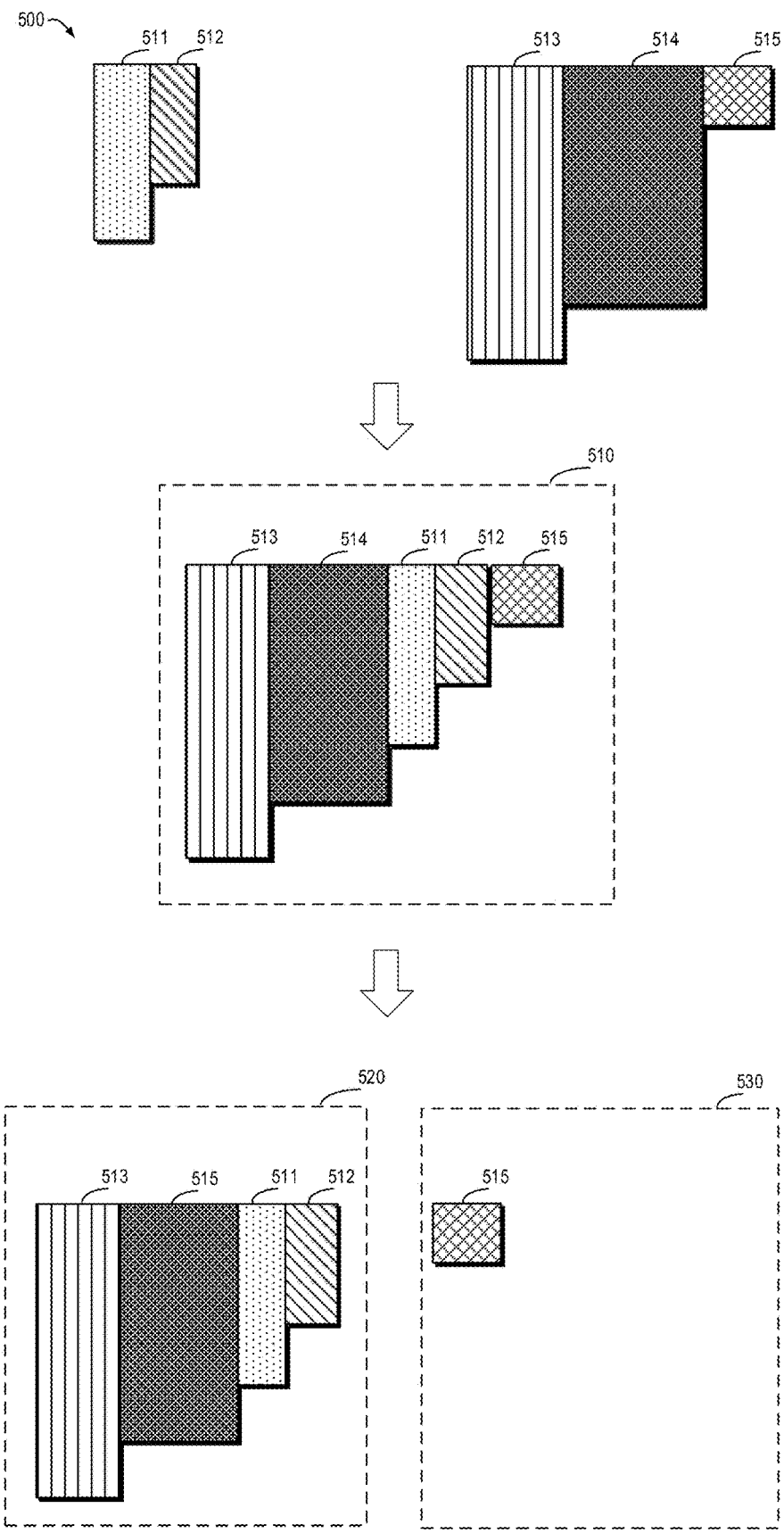
FIG. 5 is a schematic diagram of a method of dividing a plurality of storage devices into a plurality of RRSs according to some embodiments of the present disclosure.

A method of dividing a plurality of storage devices into a plurality of RRSs according to embodiments of the present disclosure will be described below with reference to FIGS. 5-7. In the embodiments as shown in FIGS. 5-7, it is assumed that a threshold number of storage devices in each RRS 300 is 25 and the RAID 300 is configured as 4D+1P RAID-5. In the embodiments, the width of the RAID 300 is 6 (i.e., 5+1). Moreover, it is assumed that the number of the reserved storage device in each set of storage devices is 1. Of course, it is provided only as an example, without limitation, and the number of reserved storage devices may be any appropriate number.

FIG. 5 is a schematic diagram illustrating a method of dividing a plurality of storage devices into a plurality of RRSs according to some embodiments of the present disclosure. As shown in FIG. 5, the RAID 500 includes a first set of storage devices 511, a second set of storage devices 512, a third set of storage devices 513, a fourth set of storage devices 514, and a fifth set of storage devices 515.

The first set of storage devices 511 includes four storage devices each having a physical capacity of 6 gigabytes (GB). The second set of storage devices 512 includes four storage devices each having a physical capacity of 4 GB. The third set of storage devices 513 includes six storage devices each having a physical capacity of 10 GB. The fourth set of storage devices 514 includes ten storage devices each having a physical capacity of 8 GB. The fifth set of storage devices 515 includes six storage devices each having a physical capacity of 2 GB.

In a descending order of the physical capacities, the storage devices from the first set of storage devices 511, the second set of storage devices 512, the third set of storage devices 513, the fourth set of storage devices 514 and the fifth set of storage devices 515 are combined into a group of storage devices 510.

Based on the group of storage devices 510, the second allocation matrix is generated as follows:

$$C_{5,1} = \begin{Bmatrix} 30 \\ 24 \\ 20 \\ 16 \\ 6 \end{Bmatrix}$$

where $C_5(10\ GB)=6$, $C_4(8\ GB)=10$, $C_3(6\ GB)=4$, $C_2(4\ GB)=4$, $C_1(2\ GB)=6$, and $C_{total}=30$.

By splitting each element in the second allocation matrix $C_{5,1}$ into elements whose number is equal to the number of a plurality of RRSs, a third allocation matrix $B_{5,2}$ is generated as below, and in the example the number of the plurality of RRSs is 2:

$$B_{5,2} = \begin{Bmatrix} 24 & 6 \\ 24 & 0 \\ 20 & 0 \\ 16 & 0 \\ 6 & 0 \end{Bmatrix}$$

By subtracting the elements in the next row of the third allocation matrix $B_{5,2}$ from the elements in the previous row, a first matrix $A_{5,2}$ in the following form is generated:

$$A_{5,2} = \begin{Bmatrix} 0 & 6 \\ 4 & 0 \\ 4 & 0 \\ 10 & 0 \\ 6 & 0 \end{Bmatrix}.$$

Thus, the first set of storage devices 511, the second set of storage devices 512, the third set of storage devices 513 and the fourth storage devices 514 in the group of storage devices 510 are divided into the first RRS 520, and the fifth set of storage devices 515 is divided into the second RRS 530.

In the example of FIG. 5, the effective capacity of the first RRS 520 is 6*10*10*8+4*6+4*4=180 GB, and the effective capacity of the second RRS 530 is 12 GB. Hence, the total effective capacity of the first RRS 520 and the second RRS 530 is 192 GB. According to the legacy solution, the first set of storage devices 511 and the second set of storage devices 51 are divided into one RRS, and the third set of storage devices 513, the fourth set of storage devices 514 and the fifth set of storage devices 515 are divided into another RRS. In this case, the total effective capacity of the two RRSs is 184 GB. Therefore, the solution of the present disclosure optimizes the total effective capacity of the RAID and improves the utilization efficiency of storage devices.

Figure 6A:
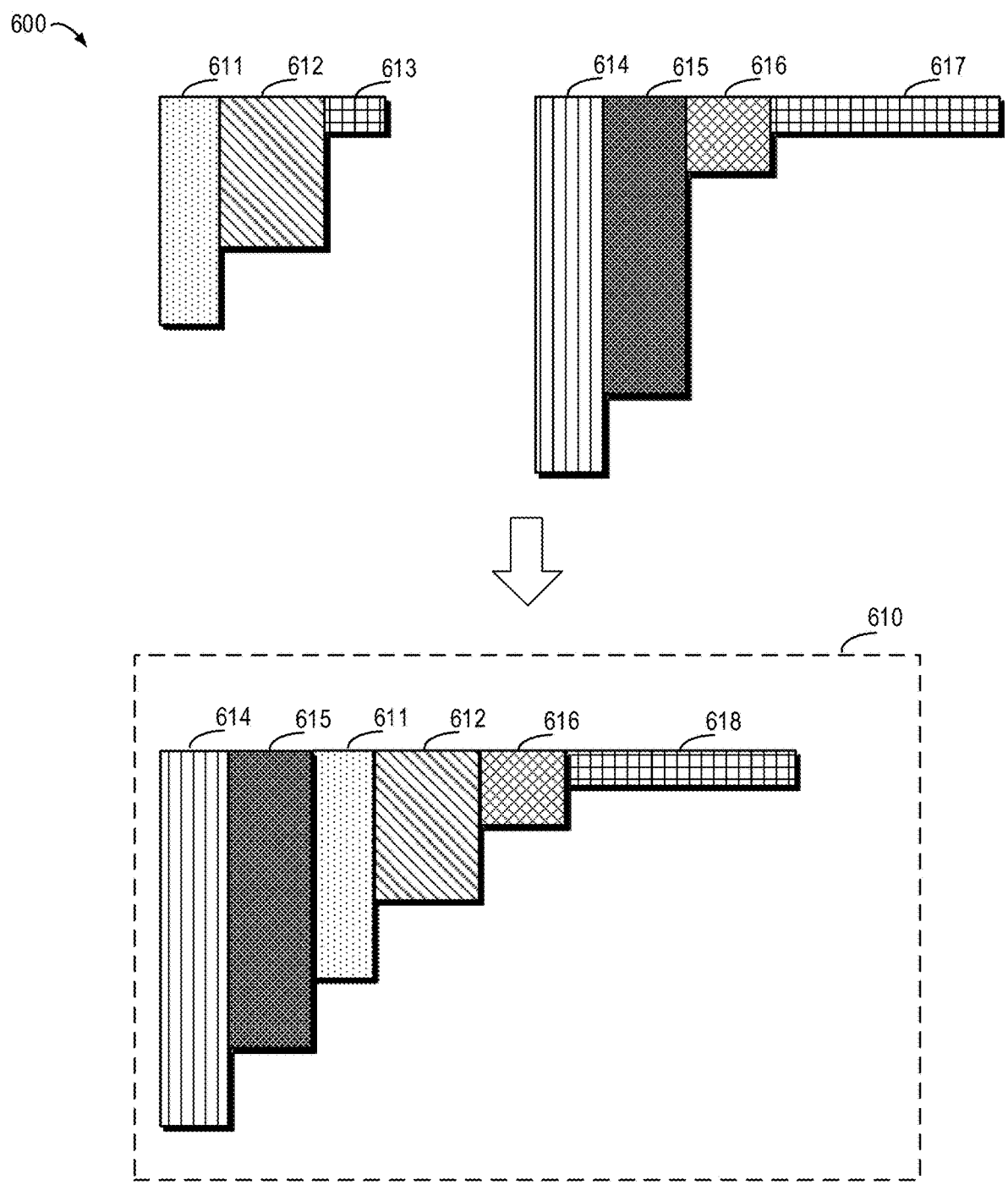
FIGS. 6A and 6B are schematic diagrams illustrating a method of dividing a plurality of storage devices into a plurality of RRSs according to some other embodiments of the present disclosure.
Figure 6B:
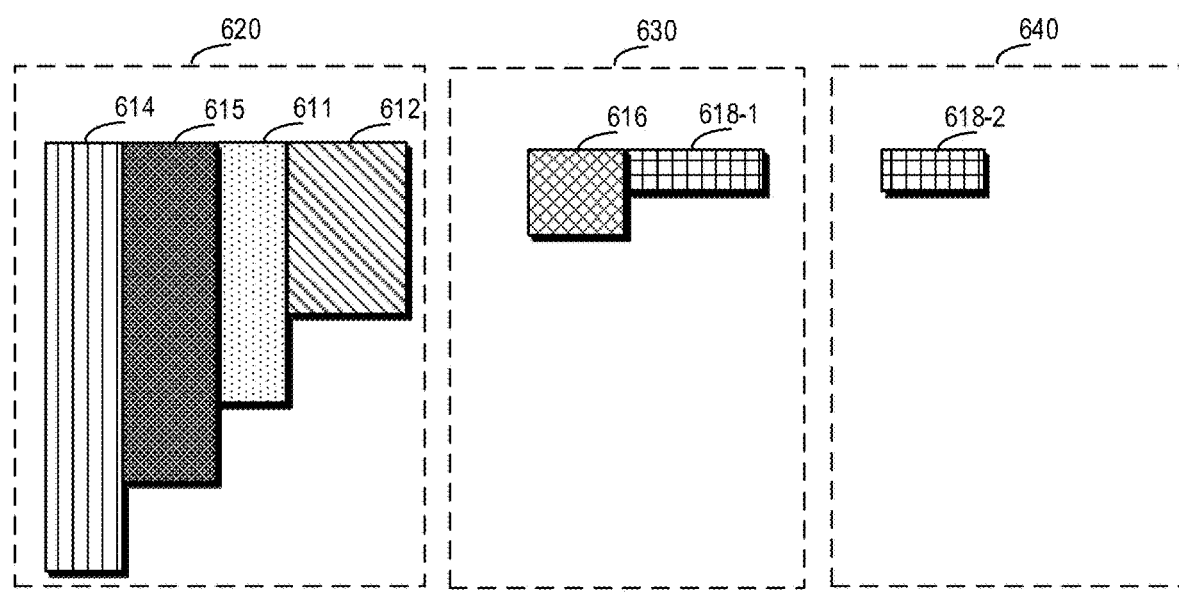

FIGS. 6A and 6B are schematic diagrams illustrating a method of dividing a plurality of storage devices into a plurality of RRSs according to some other embodiments of the present disclosure. As shown in FIG. 6A, RAID 600 includes a first set of storage devices 611, a second set of storage devices 612, a third set of storage devices 613, a fourth set of storage devices 614, a fifth set of storage devices 615, a sixth set of storage devices 616 and a seventh set of storage devices 617.

The first set of storage devices 611 includes four storage devices each having a physical capacity of 6 gigabytes (GB). The second set of storage devices 612 includes six storage devices each having a physical capacity of 4 GB. The third set of storage devices 613 includes five storage devices each having a physical capacity of 800 MB. The fourth set of storage devices 614 includes five storage devices each having a physical capacity of 10 GB. The fifth set of storage devices 615 includes ten storage devices each having a physical capacity of 8 GB. The sixth set of storage devices 616 includes ten storage devices each having a physical capacity of 2 GB. The seventh set of storage devices 617 includes twenty-one storage devices each having a physical capacity of 800 MB.

In a descending order of the physical capacities, the storage devices in the first to seven sets of storage devices 611 to 617 are combined into a group of storage devices 610. In the group of storage devices 610, the eighth set of storage devices 618 includes all of the storage devices from the third set of storage devices 613 and the seventh set of storage devices 617:

Based on the group of storage devices 610, the following second allocation matrix is generated:

$$C_{6,1} = \begin{Bmatrix} 61 \\ 35 \\ 25 \\ 15 \\ 5 \end{Bmatrix}.$$

where $C_6(10G)=5$, $C_5(8G)=10$, $C_4(6G)=4$, $C_3(4G)=6$, $C_2(2G)=10$, $C_1(800M)=26$, and $C_{total}=61$.

By splitting each element in the second allocation matrix $C_{6,1}$ into elements whose number is equal to the number of the plurality of RRSs, a third allocation matrix $B_{6,3}$ is generated, and in the example the number of the plurality of RRSs is 3:

$$B_{6,3} = \begin{Bmatrix} 25 & 25 & 1 \\ 25 & 10 & 0 \\ 25 & 0 & 0 \\ 19 & 0 & 0 \\ 15 & 0 & 0 \\ 5 & 0 & 0 \end{Bmatrix}.$$

By subtracting the elements in the next row of the third allocation matrix $B_{6,3}$ from the elements in the previous row, a first matrix $A_{6,3}$ in the following form is generated:

$$A_{6,3} = \begin{Bmatrix} 0 & 15 & 11 \\ 0 & 10 & 0 \\ 6 & 0 & 0 \\ 4 & 0 & 0 \\ 10 & 0 & 0 \\ 5 & 0 & 0 \end{Bmatrix}.$$

As such, the first set of storage devices 611, the second set of storage devices 612, the fourth set of storage devices 614, and the fifth storage devices 615 in the group of the storage devices 610 are divided into a first RRS 620, the sixth set of storage devices 616 and a part 618-1 of the eighth set of storage devices 618 are divided into a second RRS 630, and the remaining part 618-2 of the eighth set of storage devices 618 are divided into a third RRS 640, as shown in FIG. 6B.

Figure 7A:
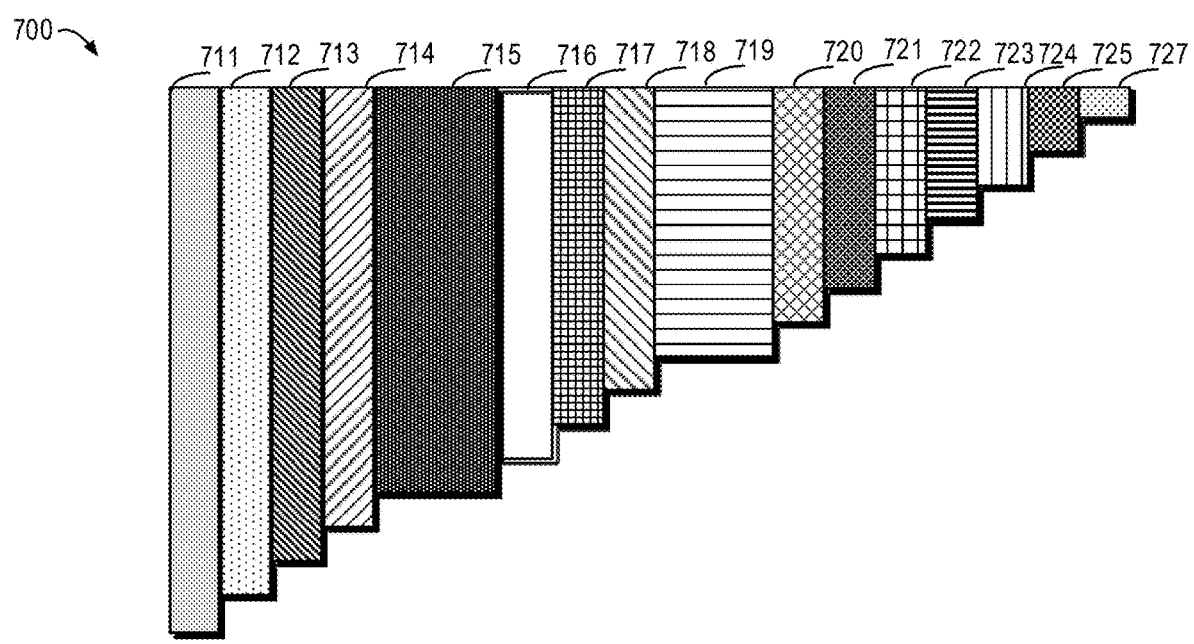
FIGS. 7A and 7B are schematic diagrams illustrating a method of dividing a plurality of storage devices into a plurality of RRSs according to some further embodiments of the present disclosure.
Figure 7B:
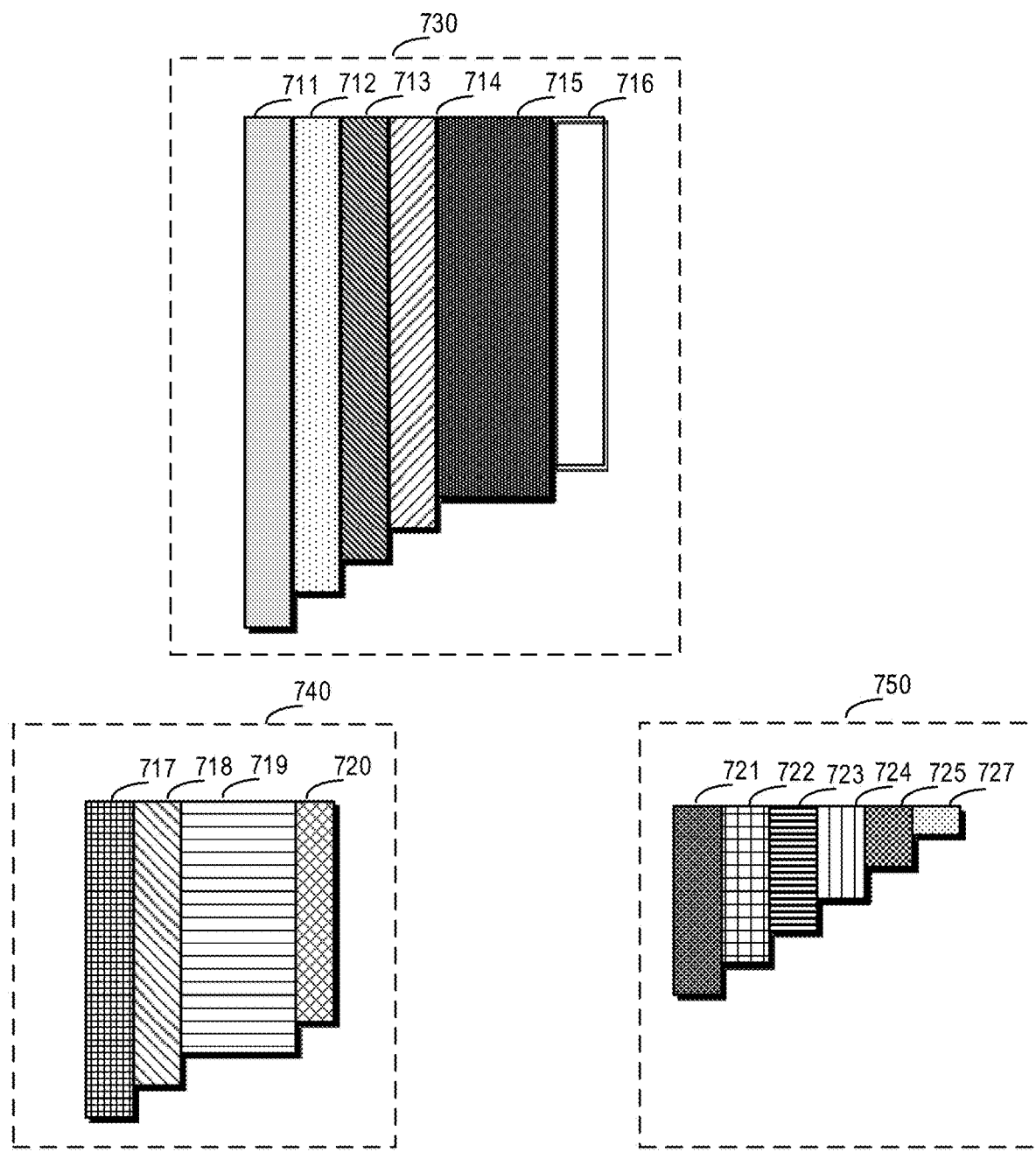

FIGS. 7A and 7B are schematic diagrams illustrating a method of dividing a plurality of storage devices into a plurality of RRSs according to some further embodiments of the present disclosure. As shown in FIG. 7A, RAID 700 includes a first set of storage devices 711, a second set of storage devices 712, a third set of storage devices 713, a fourth set of storage devices 714, a fifth set of storage devices 715, a sixth set of storage devices 716, a seventh set of storage devices 717, an eighth set of storage devices 718, a ninth set of storage devices 719, a tenth set of storage devices 720, an eleventh set of storage devices 721, a twelfth set of storage devices 722, a thirteenth set of storage devices 723, a fourteenth set of storage devices 724, a fifteenth set of storage devices 725, a sixteenth set of storage devices 726, and a seventeenth set of storage devices 727.

The sets of storage devices 711 to 714, 716 to 718, 720 to 727 each include one storage device while the fifth set of storage devices 715 includes storage devices having twenty types of physical capacities, and the ninth set of storage devices 719 includes storage devices with seventeen types of physical capacities. In the fifth set of storage devices 715, the number of storage devices of each type of physical capacity is equal to 1. In the ninth set of storage devices 719, the number of storage devices of each type of physical capacity is equal to 1.

Based on the group of storage devices comprised of the first to seventeenth sets of storage devices 711 to 727, the following second allocation matrix is generated:

$$C_{51,1} = \begin{Bmatrix} 51 \\ 50 \\ 49 \\ 48 \\ \ldots \\ 2 \\ 1 \end{Bmatrix}$$

where $C_{51}=1, C_{50}=1, \ldots, C_3=1, C_2=1, C_1=1$, and $C_{total}=51$.

By splitting each element in the second allocation matrix $C_{51,1}$ into elements whose number is equal to the number of the plurality of RRSs, the following third allocation matrix $B_{51,3}$ is generated, and in the example the number of the plurality of RRSs is 3:

$$B_{51,3} = \begin{Bmatrix} 25 & 20 & 6 \\ 25 & 19 & 6 \\ 25 & 18 & 6 \\ 25 & 17 & 6 \\ & \ldots & \\ 6 & 6 & 6 \\ 6 & 6 & 5 \\ 6 & 6 & 4 \\ 6 & 6 & 3 \\ 6 & 6 & 2 \\ 6 & 6 & 1 \\ 6 & 6 & 0 \\ 6 & 5 & 0 \\ 6 & 4 & 0 \\ 6 & 3 & 0 \\ 6 & 2 & 0 \\ 6 & 1 & 0 \\ 6 & 0 & 0 \\ 5 & 0 & 0 \\ 4 & 0 & 0 \\ 3 & 0 & 0 \\ 2 & 0 & 0 \\ 1 & 0 & 0 \end{Bmatrix}$$

By subtracting the elements in the next row of the third allocation matrix $B_{51,3}$ from the elements in the previous row, a first matrix $A_{51,3}$ in the following form is generated:

$$A_{51,3} = \begin{Bmatrix} 0 & 1 & 0 \\ 0 & 1 & 0 \\ 0 & 1 & 0 \\ 0 & 1 & 0 \\ & \ldots & \\ 0 & 0 & 1 \\ 0 & 0 & 1 \\ 0 & 0 & 1 \\ 0 & 0 & 1 \\ 0 & 0 & 1 \\ 0 & 0 & 1 \\ 0 & 1 & 0 \\ 0 & 1 & 0 \\ 0 & 1 & 0 \\ 0 & 1 & 0 \\ 0 & 1 & 0 \\ 0 & 1 & 0 \\ 0 & 1 & 0 \\ 1 & 0 & 0 \\ 1 & 0 & 0 \\ 1 & 0 & 0 \\ 1 & 0 & 0 \\ 1 & 0 & 0 \\ 1 & 0 & 0 \end{Bmatrix}.$$

In the matrix $A_{51,3}$, given that the last non-zero element in the three columns is less than 6 (i.e., the RAID width+1), the method proceeds backs to the step of generating the third allocation matrix by splitting each element in the second allocation matrix $C_{51,1}$ into 3 elements, so as to re-split each element in the second allocation matrix $C_{51,1}$, and the step of generating the first matrix by subtracting the elements in the next row from the elements in the previous row of the third allocation matrix is repeated. In this case, a plurality of first matrices are obtained. Respective total effective capacities of the plurality of first matrices are computed, and the first matrix having the greatest total effective capacity acts as the final first matrix. Hence, the following third allocation matrix $B'_{51,3}$ and first matrix $A'_{51,3}$ are obtained respectively:

$$B'_{51,3} = \begin{Bmatrix} 25 & 20 & 6 \\ 25 & 20 & 5 \\ 25 & 20 & 4 \\ 25 & 20 & 3 \\ 25 & 20 & 2 \\ 25 & 20 & 1 \\ 25 & 20 & 0 \\ 25 & 19 & 0 \\ & \ldots & \\ 25 & 6 & 0 \\ 25 & 5 & 0 \\ 25 & 4 & 0 \\ 25 & 3 & 0 \\ 25 & 2 & 0 \\ 25 & 1 & 0 \\ 25 & 0 & 0 \\ 24 & 0 & 0 \\ & \ldots & \\ 9 & 0 & 0 \\ 8 & 0 & 0 \\ 7 & 0 & 0 \\ 6 & 0 & 0 \\ 5 & 0 & 0 \\ 4 & 0 & 0 \\ 3 & 0 & 0 \\ 2 & 0 & 0 \\ 1 & 0 & 0 \end{Bmatrix}$$

$$A'_{51,3} = \left\{\begin{pmatrix} 0 & 0 & 1 \\ 0 & 0 & 1 \\ 0 & 0 & 1 \\ 0 & 0 & 1 \\ 0 & 0 & 1 \\ 0 & 0 & 1 \\ 0 & 1 & 0 \\ 0 & 1 & 0 \\ \cdots \\ 0 & 1 & 0 \\ 0 & 1 & 0 \\ 0 & 1 & 0 \\ 0 & 1 & 0 \\ 0 & 1 & 0 \\ 0 & 1 & 0 \\ 1 & 0 & 0 \\ 1 & 0 & 0 \\ \cdots \\ 1 & 0 & 0 \\ 1 & 0 & 0 \\ 1 & 0 & 0 \\ 1 & 0 & 0 \\ 1 & 0 & 0 \\ 1 & 0 & 0 \\ 1 & 0 & 0 \\ 1 & 0 & 0 \end{pmatrix}\right\}.$$

If capacity differences between respective adjacent storage devices ($C_i$ and $C_{i+1}$) having different physical capacities are the same, the first matrix $A'_{51,3}$ is the final matrix. In this case, the first to sixth sets of storage devices 711 to 716 are divided into a first RRS 730, the seventh to tenth sets of storages devices 717 to 720 are divided into a second RRS 740, and the eleventh to seventeenth sets of storage devices 721 to 727 are divided into a third RRS 750, as shown in FIG. 7B.

On the other hand, if the capacity differences between respective adjacent storage devices ($C_i$ and $C_{i+1}$) having different physical capacities are different, the first matrix $A'_{51,3}$ may not act as the final matrix. In this case, it is required to proceed back to the steps of generating the third allocation matrix by splitting each element in the second allocation matrix $C_{51,1}$ into 3 elements, and generating the first allocation matrix based on the third allocation matrix. The effective capacity of each first allocation matrix is computed, and the first matrix having the greatest total effective capacity acts as the final first matrix.

Figure 8:
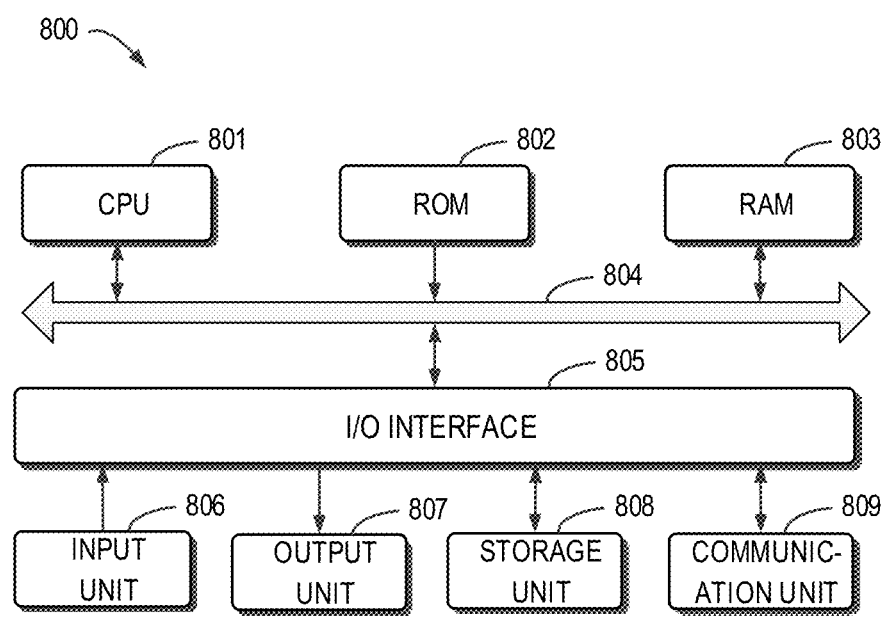
FIG. 8 is a schematic diagram illustrating an example device that may be used to implement embodiments of the present disclosure.

FIG. 8 is a block diagram illustrating an example device 800 that can be used to implement the embodiments of the present disclosure. The device 800 may be configured as including a storage system 100. The device 800 may be used to implement the method 200 or 400 in FIG. 2 or FIG. 3.

As shown, the device 800 includes a central processing unit (CPU) 801 which performs various appropriate actions and processing, based on a computer program instruction stored in a read-only memory (ROM) 802 or a computer program instruction loaded from a storage unit 808 to a random access memory (RAM) 803. The RAM 803 stores therein various programs and data required for operations of the device 800. The CPU 801, the ROM 802 and the RAM 803 are connected via a bus 804 with one another. An input/output (I/O) interface 805 is also connected to the bus 804.

The following components in the device 800 are connected to the I/O interface 805: an input unit 806 such as a keyboard, a mouse and the like; an output unit 807 including various kinds of displays and a loudspeaker, etc.; a storage unit 808 including a magnetic disk, an optical disk, and etc.; and a communication unit 809 including a network card, a modem, and a wireless communication transceiver, etc. The communication unit 809 allows the device 800 to exchange information/data with other devices through a computer network such as the Internet and/or various kinds of telecommunications networks.

The method 200 or 400 as described above may be executed by the processing unit 801. For example, in some embodiments, the method 200 or 400 may be implemented as computer software programs or computer program products that are tangibly included in a machine readable medium, e.g., the storage unit 808. In some embodiments, part or all of the computer programs may be loaded and/or mounted onto the device 800 via ROM 802 and/or communication unit 809. When the computer program is loaded to the RAM 803 and executed by the CPU 801, one or more steps of the method 200 or 400 as described above may be executed. Alternatively, in other embodiments, the CPU 801 may be configured in any other appropriate manners (for example, by means of firmware) to perform the method 200 or 400.

As would be understood by those skilled in the art, various steps of the method according to the present disclosure may be implemented via a general purpose computing device, which may be integrated on a single computing device or distributed over a network composed of a plurality of computing devices. Optionally, they may be implemented using program code executable by the computing device, such that they may be stored in a storage device and executed by the computing device; or they may be made into respective integrated circuit modules or a plurality of modules or steps therein may be made into a single integrated circuit module for implementation. In this way, the present disclosure is not limited to any specific combination of hardware and software.

It would be appreciated that, although several means or sub-means (e.g., specialized circuitry) of the device have been mentioned in detailed description above, such partition is only an example, without limitation. Actually, according to the embodiments of the present disclosure, features and functions of two or more apparatuses described above may be instantiated in one apparatus. In turn, features and functions of one apparatus described above may be further partitioned to be instantiated by various apparatuses.

What have been mentioned above are only some optional embodiments of the present disclosure and are not limiting the present disclosure. For those skilled in the art, the present disclosure may have various alternations and changes. Any modifications, equivalents and improvements made within the spirits and principles of the present disclosure should be covered within the scope of the present disclosure.

I claim:

1. A method of managing storage devices, comprising:
   combining storage devices in a redundant array of independent disks into a group of storage devices in an order of physical capacities of the storage devices;
   determining a first number of sets of storage devices based on a number of storage devices in the group and a threshold number of storage devices to be divided into each of the sets; and
   dividing, based on a configuration of the redundant array of independent disks, the group of storage devices into the first number of sets of storage devices, wherein storage devices contained in each set of storage devices within the first number of sets of storage devices are divided into fixed capacity slices of storage capacity that form a set of multiple stripes corresponding to the set, to optimize an effective capacity of the redundant array of independent disks, at least in part by generating a first allocation matrix based on the group of storage devices and a total number of different individual physical capacities of the storage devices in the group of storage devices, such that a number of rows in the first allocation matrix is equal to the total number of different individual physical capacities of the storage devices in the group of storage devices, wherein each one of the rows in the first allocation matrix corresponds to a respective one of the different individual physical capacities of the storage devices, and wherein a plurality of the storage devices have a same one of the different individual physical capacities.

2. The method of claim 1, wherein dividing the group of storage devices into the sets further comprises:
generating the first allocation matrix such that a number of columns in the first allocation matrix is equal to the first number of sets, such that each column in the first allocation matrix corresponds to one of the sets in the first number of sets, such that each individual element in the first allocation matrix represents a number of the storage devices in the set corresponding to the column containing that element that have the individual physical capacity corresponding to the row containing that element, and such that an order of the rows in the first allocation matrix corresponds to an order of the different individual physical capacities of the storage devices in the group of storage devices.

3. The method of claim 1, wherein combining the storage devices in the redundant array of independent disks into the group of storage devices in the order of physical capacities of the storage devices comprises:
combining the storage devices in the redundant array of independent disks into the group of storage devices in a descending order of the physical capacities.

4. An electronic device, comprising:
at least one processor; and
a memory coupled to the processor, the memory storing computer programs, the computer programs, when executed by the processor, causing the electronic device to perform acts comprising:
combining storage devices in a redundant array of independent disks into a group of storage devices in an order of physical capacities of the storage devices;
determining a first number of sets of storage devices based on a number of storage devices in the group and a threshold number of storage devices to be divided into each of the sets; and
dividing, based on a configuration of the redundant array of independent disks, the group of storage devices into the first number of sets of storage devices, to optimize an effective capacity of the redundant array of independent disks, wherein storage devices contained in each set of storage devices within the first number of sets of storage devices are divided into fixed capacity slices of storage capacity that form a set of multiple stripes corresponding to the set, at least in part by generating a first allocation matrix based on the group of storage devices and a total number of different individual physical capacities of the storage devices in the group of storage devices, such that a number of rows in the first allocation matrix is equal to the total number of different individual physical capacities of the storage devices in the group of storage devices, wherein each one of the rows in the first allocation matrix corresponds to a respective one of the different individual physical capacities of the storage devices, and wherein a plurality of the storage devices have a same one of the different individual physical capacities.

5. The electronic device of claim 4, wherein dividing the group of storage devices into the sets further comprises:
generating the first allocation matrix such that a number of columns in the first allocation matrix is equal to the first number of sets, such that each column in the first allocation matrix corresponds to one of the sets in the first number of sets, such that each individual element in the first allocation matrix represents a number of the storage devices in the set corresponding to the column of the first allocation matrix containing that element that have the individual physical capacity corresponding to the row containing that element, and such that an order of the rows in the first allocation matrix corresponds to an order of the different individual physical capacities of the storage devices in the group of storage devices.

6. The electronic device of claim 4, wherein combining the storage devices in the redundant array of independent disks into the group of storage devices in the order of physical capacities of the storage devices comprises:
combining the storage devices in the redundant array of independent disks into the group of storage devices in a descending order of the physical capacities.

7. A computer program product having a non-transitory computer readable medium which stores a set of instructions to manage storage devices; the set of instructions, when carried out by computerized circuitry, causing the computerized circuitry to perform a method of:
combining storage devices in a redundant array of independent disks into a group of storage devices in an order of physical capacities of the storage devices;
determining a first number of sets of storage devices based on a number of storage devices in the group and a threshold number of storage devices to be divided into each of the sets; and
dividing, based on a configuration of the redundant array of independent disks, the group of storage devices into the first number of sets of storage devices, wherein storage devices contained in each set of storage devices within the first number of sets of storage devices are divided into fixed capacity slices of storage capacity that form a set of multiple stripes corresponding to the set, to optimize an effective capacity of the redundant array of independent disks, at least in part by generating a first allocation matrix based on the group of storage devices and a total number of different individual physical capacities of the storage devices in the group of storage devices, such that a number of rows in the first allocation matrix is equal to the total number of different individual physical capacities of the storage devices in the group of storage devices, wherein each one of the rows in the first allocation matrix corresponds to a respective one of the different individual physical capacities of the storage devices, and wherein a plurality of the storage devices have a same one of the different individual physical capacities.

8. The method of claim 1, wherein the group of storage devices includes both at least one storage device in an existing set of storage devices and at least one storage device in a new set of storage devices added to the existing set of storage devices.

\* \* \* \* \*